United States Patent
Kotecha

(10) Patent No.: US 9,590,789 B2
(45) Date of Patent: *Mar. 7, 2017

(54) TECHNIQUES FOR REDUCING COMMUNICATION ERRORS IN A WIRELESS COMMUNICATION SYSTEM

(71) Applicant: Apple Inc., Cupertino, CA (US)

(72) Inventor: Jayesh Kotecha, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/500,848

(22) Filed: Sep. 29, 2014

(65) Prior Publication Data

US 2015/0016399 A1    Jan. 15, 2015

Related U.S. Application Data

(63) Continuation of application No. 13/136,486, filed on Aug. 1, 2011, which is a continuation of application (Continued)

(51) Int. Cl.
*H04L 5/00* (2006.01)
*H04L 1/00* (2006.01)
(Continued)

(52) U.S. Cl.
CPC .......... *H04L 5/0057* (2013.01); *H04L 1/0026* (2013.01); *H04L 1/0027* (2013.01); *H04L 1/0031* (2013.01); *H04W 72/042* (2013.01); *H04W 72/0413* (2013.01); *H04W 72/14* (2013.01); *H04L 1/1671* (2013.01); *H04L 1/1896* (2013.01); *H04W 28/04* (2013.01);
(Continued)

(58) Field of Classification Search
CPC ... H04L 1/0026; H04L 1/0027; H04L 1/0031; H04L 1/1671; H04L 1/1896; H04L 5/0053; H04L 5/0057; H04L 5/0082; H04W 28/04; H04W 72/08; H04W 72/0413; H04W 72/042; H04W 72/1284; H04W 72/14

See application file for complete search history.

(56) References Cited

U.S. PATENT DOCUMENTS

2005/0201474 A1    9/2005    Cho et al.
2006/0251080 A1    11/2006    Knapp
(Continued)

OTHER PUBLICATIONS

Intel, "E-UTRA Uplink and Downlink Control Signaling—Text Proposal", May 8-12, 2006, 3 pages, TSG-RAN WG1 #45, Shanghai, China.

(Continued)

*Primary Examiner* — Khoa Huynh
(74) *Attorney, Agent, or Firm* — Meyertons, Hood, Kivlin, Kowert & Goetzel, P.C.

(57) ABSTRACT

A technique for operating a wireless communication device includes transmitting a scheduling request from the wireless communication device and receiving, following the scheduling request, an uplink grant that assigns an uplink channel to the wireless communication device. A time period between the scheduling request and the uplink grant is determined. Only channel quality information is transmitted in the uplink channel when the uplink grant requests the channel quality information and the time period is less than a predetermined time period.

7 Claims, 6 Drawing Sheets

Related U.S. Application Data

No. 12/052,621, filed on Mar. 20, 2008, now Pat. No. 7,990,919.

(51) Int. Cl.
  *H04W 72/04* (2009.01)
  *H04W 72/14* (2009.01)
  *H04W 28/04* (2009.01)
  *H04L 1/16* (2006.01)
  *H04L 1/18* (2006.01)
  *H04W 72/08* (2009.01)
  *H04W 72/12* (2009.01)

(52) U.S. Cl.
  CPC ........ *H04W 72/08* (2013.01); *H04W 72/1284* (2013.01)

(56) References Cited

U.S. PATENT DOCUMENTS

| | | |
|---|---|---|
| 2007/0201397 A1 | 8/2007 | Zhang |
| 2007/0211656 A1 | 9/2007 | Kwak et al. |
| 2008/0032630 A1 | 2/2008 | Kim et al. |
| 2009/0204863 A1 | 8/2009 | Kim et al. |
| 2010/0113057 A1 | 5/2010 | Englund et al. |
| 2010/0146354 A1 | 6/2010 | Zhang et al. |
| 2010/0202306 A1* | 8/2010 | Jersenius ........... H04B 17/0067 370/252 |
| 2010/0202420 A1 | 8/2010 | Jersenius et al. |
| 2010/0255850 A1* | 10/2010 | Kaukoranta ...... H04W 74/0866 455/450 |
| 2011/0002290 A1 | 1/2011 | Kim et al. |
| 2011/0319116 A1 | 12/2011 | Iwamura et al. |

OTHER PUBLICATIONS

Ericsson, "CQI Reporting on the PUSCH", Jan. 14-18, 2008, 2 pages, 3GPP TSG-RAN WG1 #51bis, Sevilla, Spain.

Ericsson, "On CQI Reporting", Aug. 20-24, 2007, 4 pages, 3GPP TSG-RAN WG1 Meeting #50, Athens, Greece.

Philips, NXP Semiconductors, "Control of CQI feedback signaling in E-UTRA", May 7-11, 2007, 3 pages, 3GPP TSG RAN WG1 Meeting #49, Kobe, Japan.

\* cited by examiner

| FIELD | BITS | COMMENT |
|---|---|---|
| FORMAT | 1 | UPLINK GRANT OR DOWNLINK ASSIGNMENT (FLAG FOR FORMAT0/FORMAT1A DIFFERENTIATION) |
| HOPPING FLAG | 1 | FREQUENCY HOPPING ON/OFF |
| RB ASSIGNMENT | 13 | |
| MCS | 2 | |
| RETRANSMISSION SEQUENCE NUMBER (RSN) | 2 | 1-3 FROM ATHENS |
| TPC | 2 | POWER CONTROL OF PUSCH |
| CYCLIC SHIFT FOR DMRS | 3 | |
| TX ANTENNA SELECTION | 0 | 0 OR 1; IMPLICITY DERIVED FROM OTHER INFORMATION? |
| UL INDEX (TDD ONLY) | 0 | USED TO INDICATE WHICH UPLINK SUBFRAME(S) THE GRANT IS VALID FOR. NECESSARY FOR TDD |
| CQI REQUEST | 1 | |
| RNTI/CRC | 16 | 16 BIT RNTI IMPLICITY ENCODED IN CRC |
| TOTAL | 44 | |

*FIG. 1*

TECHNIQUES FOR REDUCING COMMUNICATION ERRORS IN A WIRELESS COMMUNICATION SYSTEM

PRIORITY CLAIM

This application is a continuation of and claims the benefit of priority from U.S. patent application Ser. No. 13/136,486, entitled "Techniques for Reducing Communication Errors in a Wireless Communication System" and filed on Aug. 1, 2011, which is a continuation of and claims the benefit of priority from U.S. patent application Ser. No. 12/052,621, entitled "Techniques for Reducing Communication Errors in a Wireless Communication System" and filed on Mar. 20, 2008 (issued as U.S. Pat. No. 7,990,919 on Aug. 2, 2011), both of which are fully incorporated herein by reference for all purposes and to the extent not inconsistent with this application.

BACKGROUND

Field

This disclosure relates generally to a wireless communication system and, more specifically, to techniques for reducing communication errors in a wireless communication system.

Related Art

Wireless networks that employ third-generation partnership project-long term evolution (3GPP-LTE) compliant architectures are currently required to utilize aperiodic channel quality information (CQI) uplink grants when a scheduler (associated with a serving base station (BS)) desires to schedule a downlink data transmission to a user end (UE) or subscriber station (SS). The scheduler utilizes CQI reported by the SS (in response to an aperiodic CQI uplink grant) to determine which portion of a system bandwidth to utilize for a downlink transmission to the SS. With reference to FIG. 1, a table 100 depicts an example physical downlink control channel (PDCCH) format that may be utilized to signal an uplink grant or a downlink assignment to an SS (from a scheduler via a serving BS) via a PDCCH. As is illustrated, the PDCCH format includes: a one-bit format field; a one-bit hopping flag field; a thirteen-bit resource block (RB) assignment field; a five-bit modulation and coding scheme (MCS) field; a two-bit retransmission sequence number (RSN) field; a two-bit transmit power control (TPC) field; a three-bit cyclic shift for a demodulation reference signal (DMRS) field; a one-bit CQI request field; and a sixteen-bit radio network temporary identifier/cyclic redundancy check (RNTI/CRC) field.

A value of the one-bit format field specifies whether a transmission on the PDCCH is an uplink grant or a downlink assignment. A value of the one-bit hopping flag field specifies whether frequency hopping is turned on or off and a value of the thirteen-bit RB assignment field specifies which RBs are assigned to an SS for uplink or downlink transmissions. A value of the five-bit MCS field specifies what MCS is assigned to a transmission. A value of the two-bit RSN field specifies a retransmission sequence and a value of the two-bit TPC field specifies a transmit power level on a physical uplink shared channel (PUSCH). A value of the three-bit cyclic shift for DMRS field specifies a cyclic shift for a DMRS and a value of the one-bit CQI request field specifies whether CQI is requested. Finally, a value of the sixteen-bit RNTI/CRC field specifies a unique identifier for the SS. A scheduler asserts a value in the one-bit CQI request field to request CQI from an SS. As previously noted, a scheduler uses a reported CQI to schedule a downlink transmission for an SS.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 1 is a diagram of an example physical downlink control channel (PDCCH) format that may be employed to signal an uplink (UL) grant or a downlink (DL) assignment from a scheduler, via a serving base station (BS), to a subscriber station (SS).

DETAILED DESCRIPTION

Figure 2:
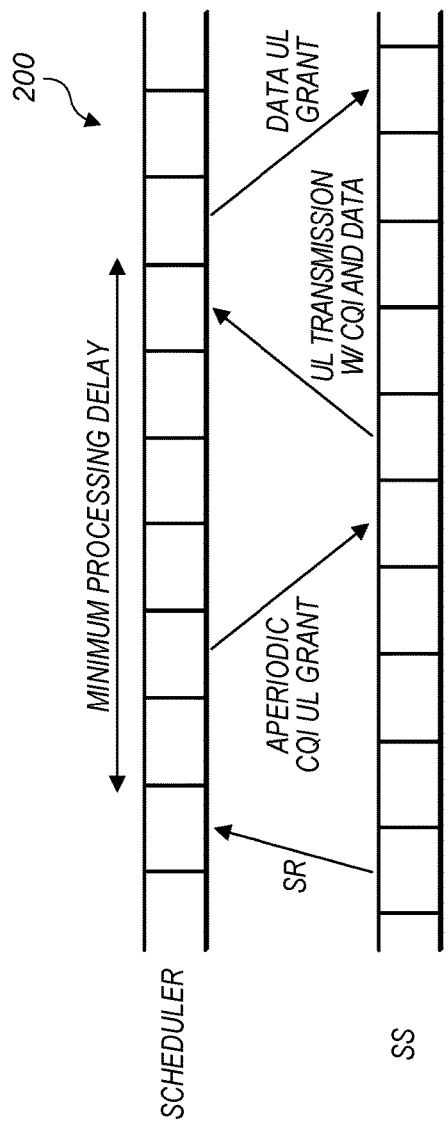
FIG. 2 is an example diagram depicting a scheduling request (SR) that is transmitted from an SS and an aperiodic channel quality information (CQI) uplink grant that is transmitted (from a serving BS) to the SS prior to a data uplink grant for the SR due to processing delay.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, the embodiments described below may be embodied in various wireless communication devices.

As may be used herein, the term "channel" includes one or more subcarriers, which may be adjacent or distributed across a frequency band. Moreover, the term "channel" may include an entire system bandwidth or a portion of the entire system bandwidth. The term, "resource block," as used herein, includes a number of subcarriers (e.g., twelve subcarriers) which may or may not be adjacent. As is also used herein, the term "subscriber station" is synonymous with the terms "user equipment" and "user end," which include a wireless communication device that may (or may not) be mobile.

A scheduler that is compatible with current LTE agreements schedules aperiodic feedback of channel quality information (CQI) from a subscriber station (SS) by asserting a CQI request bit in an uplink grant transmitted to the SS (in a downlink transmission from a serving BS associated with the scheduler) over a physical downlink control channel (PDCCH). For example, if a serving BS has buffered data to transmit to the SS the scheduler may request CQI from the SS to determine which downlink channel to schedule for a downlink data transmission to the SS. However, if an SS sends a scheduling request (SR) for a data uplink transmission and a scheduler schedules an aperiodic CQI uplink grant within a predetermined time period (e.g., a processing delay time period that corresponds to multiple sub-frames) of the SR, the SS may interpret the aperiodic CQI uplink grant as an uplink grant for CQI and data (even though the scheduler was unaware of the SR when the scheduler scheduled the aperiodic CQI uplink grant). In this case, an error condition may occur when the SS sends CQI and data as the serving BS is only expecting CQI.

According to various aspects of the present disclosure, the error condition (e.g., attributable to the SS transmitting CQI and data when the serving BS is only expecting CQI) may be resolved or avoided by mandating certain scheduler and/or SS behavior. According to one embodiment of the present disclosure, an SS may be configured to determine a time period between when an SR was transmitted and an uplink grant was received. If the time period is not greater than a predetermined time period (e.g., a time period corresponding to an average processing delay, which may include multiple sub-frames) the SS is configured to only transmit CQI in response to the uplink grant (as the SS assumes that the uplink grant is an aperiodic CQI uplink grant, as contrasted with a data uplink grant that also requested CQI).

According to another embodiment of the present disclosure, an SS may be configured to not transmit data and CQI together. As such, when an uplink grant is received, the SS is configured to only transmit CQI (as contrasted with transmitting both CQI and data) in an uplink channel (associated with the uplink grant) when CQI is requested. The uplink channel may, for example, be included in a physical uplink shared channel (PUSCH). In the cases above, the serving BS is configured to expect only CQI in response to an uplink grant that requested CQI (i.e., an aperiodic CQI uplink grant). According to a different aspect of the present disclosure, in order to avoid the error condition (e.g., attributable to the SS transmitting CQI and data when the serving BS is only expecting CQI), a scheduler is configured to not schedule a CQI uplink grant within a predetermined time period (e.g., a time period corresponding to an average processing delay) of an SR. According to another aspect of the present disclosure, a serving BS may be configured to perform blind detection in an uplink transmission following an aperiodic CQI uplink grant to determine whether a received transmission includes only CQI (or both CQI and data). As used herein, the term "blind detection" means that a serving BS ascertains whether information received in an assigned uplink channel includes CQI and data or only CQI based only on the received information.

As noted above, a scheduler can request an aperiodic feedback of CQI from an SS. As currently agreed, the aperiodic feedback of CQI is accomplished in an LTE compliant architecture by using a single bit (i.e., a CQI request bit (see FIG. 1)) in an uplink grant transmitted (via a serving BS) from a scheduler to an SS (via a downlink signal) over a physical downlink control channel (PDCCH). The current PDDCH format for LTE compliant architectures (see FIG. 1) does not, however, allow the scheduler to request a CQI only feedback. That is, the CQI request bit only flags an uplink CQI request and an SS may (or may not) transmit data along with the CQI. For example, assuming that an SS has transmitted an SR for a data uplink channel allocation and the CQI request bit is asserted in a received uplink grant, the SS may transmit both CQI and data in an uplink channel assigned by the uplink grant. As noted above, when a serving BS receives CQI and data (and the serving BS only expected CQI) packet errors and overhead loss may result.

For example, an error may occur when an SS requests an uplink grant for data and the scheduler does not have enough resources to allocate to the SS (for some time period) and only allocates an uplink grant after a time delay between which the scheduler schedules an aperiodic CQI uplink grant in order to schedule a downlink transmission to the SS. In this case, an aperiodic CQI uplink grant may be confused by the SS with an uplink grant for data and CQI. An error may also occur when an SS requests an uplink grant (for a data transmission) and the uplink grant is not detected by the serving BS, received in error by the serving BS, or is deferred (for various reasons) by the scheduler. In this case, an SS may also confuse an aperiodic CQI uplink grant with an uplink grant for both CQI and data which results in the serving BS detecting an error (assuming the serving BS is not configured to perform blind detection).

According to various aspects of the present disclosure, the error condition (e.g., attributable to the SS transmitting CQI and data when the serving BS is only expecting CQI due to non-detection of an SR or deferred processing of the SR) may be resolved or avoided by mandating certain scheduler and/or SS behavior. According to one embodiment of the present disclosure, the error condition can be avoided in an LTE compliant architecture by configuring PDCCH bits so that the scheduler can schedule the SS to transmit CQI only or CQI and data. Specification of only CQI or CQI and data in an uplink grant can be implemented in conjunction with a CQI request bit by using, for example, one of thirty-two modulation and coding scheme (MCS) values to indicate a CQI only request (as not all MCS values are currently used in LTE compliant architectures).

In another embodiment, multiple MCS values (each having a different associated delay) may be employed to indicate a CQI only request. For example, one MCS value may have an associated delay of, for example, four sub-frames and another MCS value may have an associated delay of, for example, eight sub-frames. In either case, an SS is configured to delay transmission of CQI an amount that is associated with the MCS value. Alternatively, an additional CQI request bit (or bits) may be employed to indicate whether an uplink grant is for only CQI or CQI and data. Values associated with the additional CQI request bit (or bits) may also have different associated delays. It should be appreciated that different fields, other than the MCS field, may be reused according to the present disclosure to clearly signal whether an uplink grant is for only CQI or CQI and data.

The disclosed techniques are contemplated to be applicable to systems that employ either orthogonal frequency division multiplex (OFDM) or single-carrier frequency division multiple access (SC-FDMA) signaling on uplink and/or downlink channels. A transmitter of an SS or serving BS may implement one of a phase shift keying (PSK), a quadrature amplitude modulation (QAM), or other data modulation scheme, depending upon which modulation scheme is scheduled. It should be appreciated that any of the various PSK, e.g., pi/2 BPSK, QPSK and 8-PSK, or QAM, e.g., 16-QAM and 64-QAM, modulation techniques may be implemented in a wireless communication system constructed according to the present disclosure.

According to another embodiment of the present disclosure, a technique for operating a wireless communication device includes transmitting a scheduling request from the wireless communication device and receiving, following the scheduling request, an uplink grant that assigns an uplink channel to the wireless communication device. Only channel quality information is transmitted in the uplink channel when the uplink grant requests the channel quality information. In another embodiment, when the uplink grant does not request the channel quality information, only data is transmitted in the uplink channel.

According to one embodiment of the present disclosure, a technique for operating a wireless communication device includes transmitting a scheduling request from the wireless communication device and receiving, following the scheduling request, an uplink grant that assigns an uplink channel to the wireless communication device. A time period between the scheduling request and the uplink grant is determined. Only channel quality information is transmitted in the uplink channel when the uplink grant requests the channel quality information and the time period is less than a predetermined time period.

According to yet another embodiment of the present disclosure, a technique for operating a wireless communication device includes transmitting a scheduling request from the wireless communication device and receiving, following the scheduling request, an uplink grant that assigns an uplink channel to the wireless communication device. One or more fields in the uplink grant are then decoded. Only the channel quality information is transmitted in the uplink channel when the one or more decoded fields specify that only the channel quality information is to be transmitted in the uplink grant.

According to one aspect of the present disclosure, a technique for operating a wireless communication device includes receiving, at a first wireless communication device, a scheduling request from a second wireless communication device. A channel quality information uplink grant, which assigns an uplink channel to the second wireless communication device, is then scheduled for the second wireless communication device at least a predetermined time period after the scheduling request. The first wireless communication device then transmits the scheduled channel quality information uplink grant.

According to another aspect of the present disclosure, a technique for operating a wireless communication device includes receiving, in an assigned uplink channel, a transmission in response to an uplink grant. The transmission is then decoded to determine whether the transmission includes only channel quality information or the channel quality information and data.

According to a different aspect of the present disclosure, a technique for operating a wireless communication device includes encoding, at a first wireless communication device, one or more fields in an uplink grant (which assigns an uplink channel to the second wireless communication device) for a second wireless communication device. The first wireless communication device transmits the uplink grant. Only channel quality information is received in the uplink channel when the one or more encoded fields specified that only the channel quality information was to be transmitted in the uplink grant.

With reference to FIG. 2, an example communication diagram 200 illustrates an example communication sequence between an SS and a scheduler associated with a serving BS. In the example communication sequence, an SR is transmitted from the SS to the scheduler when the SS wishes to transmit data on an uplink channel. As is illustrated, due to processing delay, an aperiodic CQI uplink grant is transmitted prior to a data uplink grant. In this case, the SS may mistake the CQI uplink grant for a data uplink grant (that also requests CQI) and transmit both CQI and data to the serving BS in the CQI uplink grant. As the serving BS is only expecting CQI in the CQI uplink grant (and in the event that the serving BS is incapable of correctly decoding both CQI and data), a communication error is detected in a conventional wireless communication system that requires retransmission. However, in a wireless communication system configured according to the present disclosure, the communication error is avoided by proper configuration of the scheduler and/or the SS.

Figure 3:
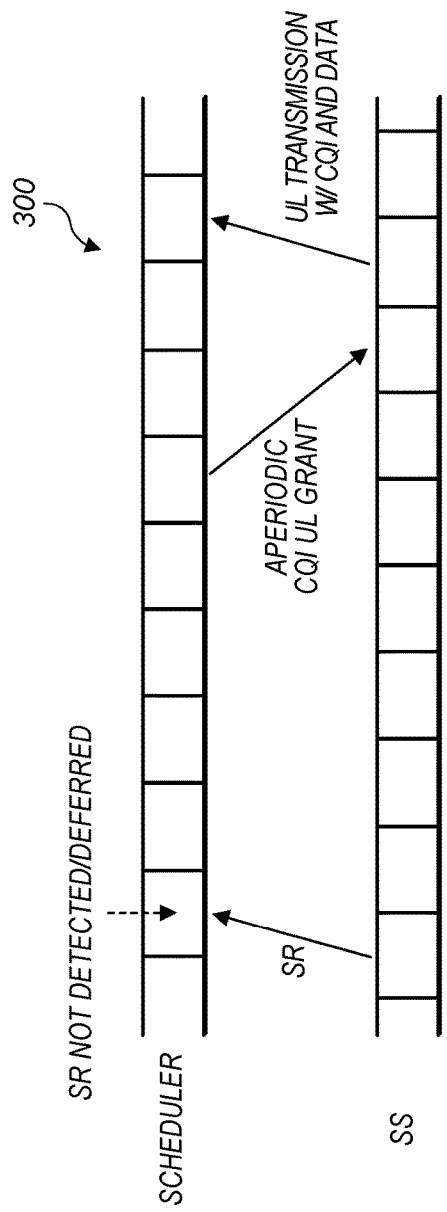
FIG. 3 is another example diagram depicting an SR that is transmitted from an SS and an aperiodic CQI uplink grant that is transmitted from a serving BS prior to a data uplink grant for the SR due to the SR not being detected or being deferred.

With reference to FIG. 3, an example communication diagram 300 illustrates an example communication sequence between an SS and a scheduler associated with a serving BS. In the example communication sequence, an SR is transmitted from the SS to the scheduler when the SS wishes to transmit data on an uplink channel. As is illustrated, due to the SR not being detected (or the SR being deferred due to, for example, lack of network capacity), an aperiodic CQI uplink grant is transmitted prior to a data uplink grant for the SR. In this case, the SS may also mistake the CQI uplink grant for a data uplink grant (that also requests CQI) and transmit both CQI and data to the serving BS in the CQI uplink grant. As the serving BS is only expecting CQI in the CQI uplink grant (and in the event that the serving BS is incapable of correctly decoding both CQI and data) a communication error is also detected in a conventional wireless communication system that requires retransmission. However, in a wireless communication system configured according to the present disclosure, the communication error is also avoided by proper configuration of the scheduler and/or the SS.

Figure 4:
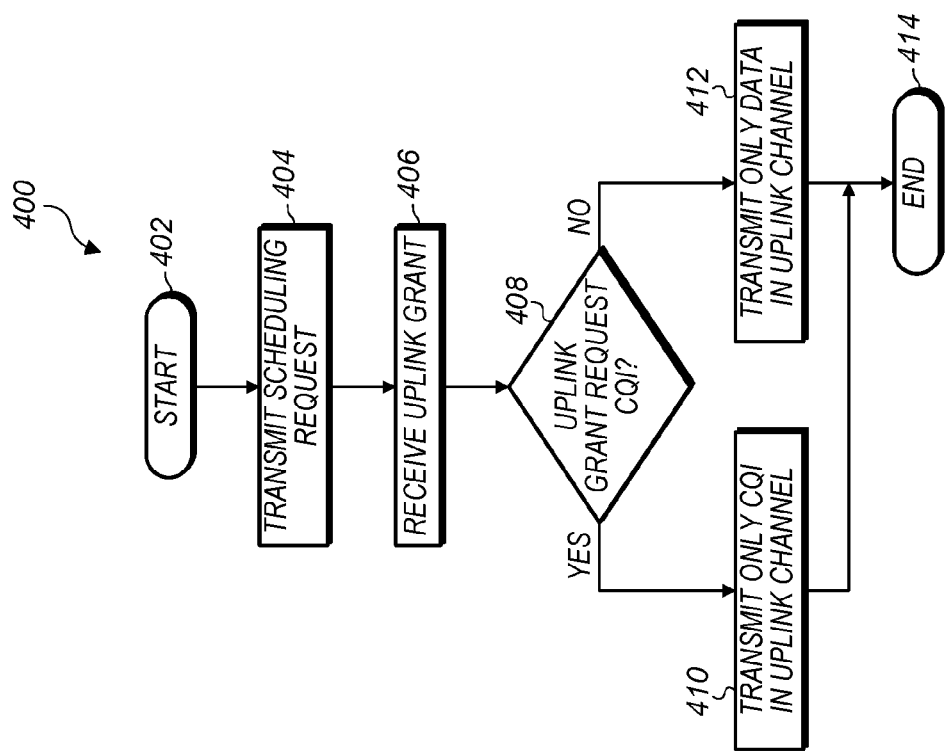
FIG. 4 is a flowchart of an example communication error reduction routine, according to the present disclosure.

Turning to FIG. 4, an example communication routine 400 is depicted that is configured to reduce communication errors in a wireless communication system according to one aspect of the present disclosure. The routine 400, which may be employed in an SS, is initiated at block 402, at which point control transfers to block 404. In block 404, the SS transmits an SR for an uplink channel allocation to a scheduler. Next, in block 406, the SS receives an uplink grant from the scheduler (e.g., via a serving BS). Then, in decision block 408, the SS determines whether the uplink grant requests CQI. For example, with reference to FIG. 1, the SS may decode a CQI request bit to determine whether CQI is requested. If CQI is requested in block 408 control transfers to block 410, where the SS transmits only CQI in an assigned uplink channel. If CQI is not requested in block 408 control transfers to block 412, where the SS transmits only data in the assigned uplink channel. In this manner, communication errors are avoided in that data and CQI are not transmitted in a same uplink channel allocation. It should be appreciated that constraining a system such that data and CQI are not sent together may reduce overall efficiency of a system in certain cases (as a data uplink grant with a CQI request may be interpreted as an aperiodic CQI uplink grant). Following blocks 410 and 412, control transfers to block 414 where control returns to a calling routine.

Figure 5:
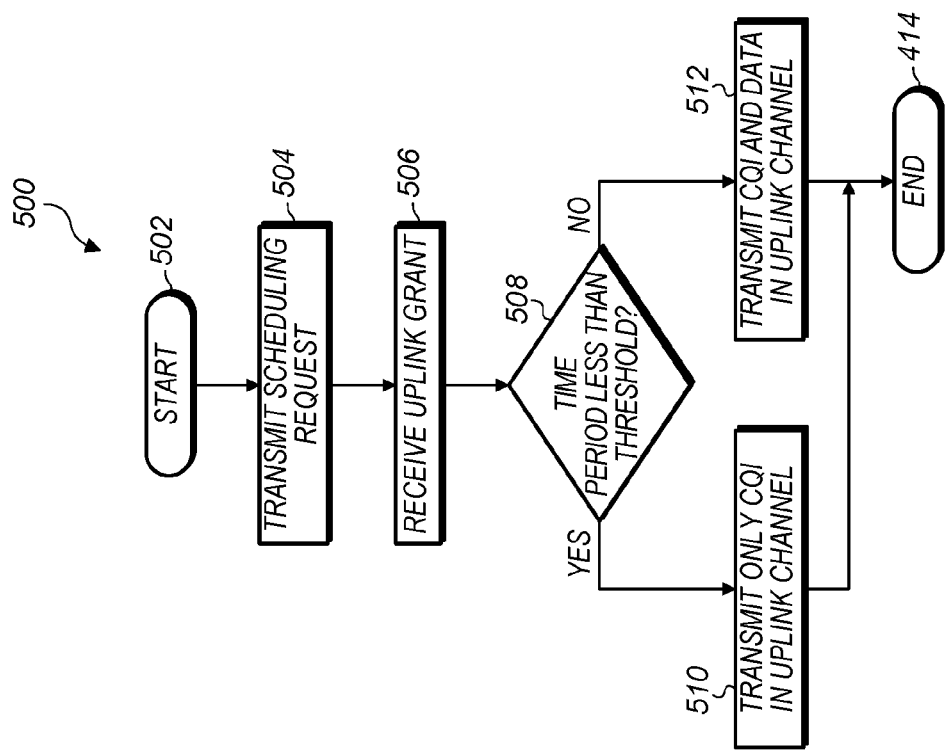
FIG. 5 is a flowchart of an example communication error reduction routine, according to one embodiment of the present disclosure.

With reference to FIG. 5, an example communication routine 500 is illustrated that is configured to reduce communication errors in a wireless communication system according to another aspect of the present disclosure. The routine 500, which may be employed in an SS, is initiated at block 502, at which point control transfers to block 504. In block 504, the SS transmits a scheduling request (SR) for an uplink channel allocation to a serving BS. Next, in block 506, the SS receives an uplink grant from a scheduler (associated with the serving BS). Then, in decision block 508, the SS determines whether a time period between the SR and the uplink grant is less that a threshold time period. In a typical case, the threshold time period corresponds to a processing delay time.

If the time period is less than the threshold in block 508, control transfers to block 510 where the SS transmits only CQI in an assigned uplink channel. If the time period is not less than the threshold in block 508 control transfers to block 512, where the SS transmits CQI and data in the assigned uplink channel. In this manner, communication errors associated with processing delay may be avoided as data and CQI are not transmitted in an uplink channel associated with an aperiodic CQI uplink grant. It should be appreciated that if an SR is not detected (or is deferred by a scheduler), a communication error may not be avoided when the time between transmitting the SR and receiving the uplink grant are greater than the threshold time period (as an aperiodic CQI uplink grant may be received more than a threshold time period after an SR, but prior to a data uplink grant that also requests CQI). Following blocks 510 and 512, control transfers to block 514 where control returns to a calling routine.

Figure 6:
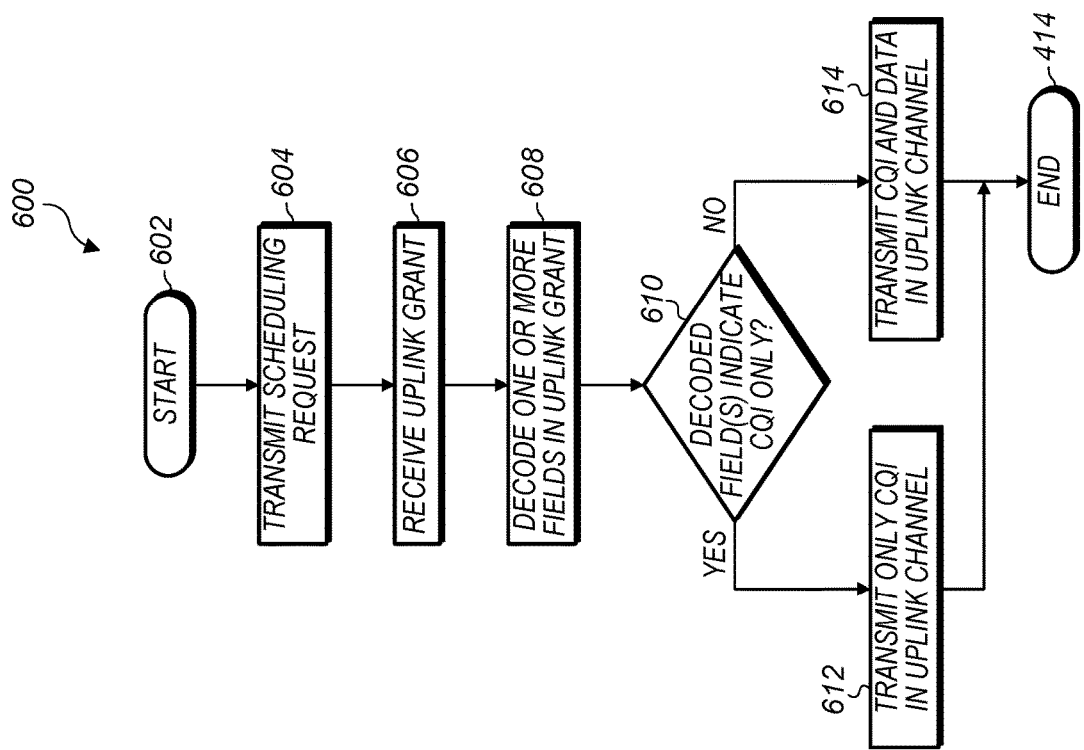
FIG. 6 is a flowchart of an example communication error reduction routine, according to another embodiment of the present disclosure.

With reference to FIG. 6, an example communication routine 600 is depicted that is configured to reduce communication errors in a wireless communication system according to yet another aspect of the present disclosure. The routine 600, which may be employed in an SS, is initiated at block 602, at which point control transfers to block 604. In block 604, the SS transmits an SR for an uplink channel allocation to a serving BS. Next, in block 606, the SS receives an uplink grant from a scheduler (e.g., via the serving BS). Then, in block 608, the SS decodes one or more fields in the uplink grant. For example, the SS may decode a bit in a one-bit CQI request field and five bits in an MCS field to determine if only CQI or CQI and data are scheduled for an uplink channel associated with the uplink grant.

Next, in decision block 610, the SS determines whether the decoded field(s) indicate that CQI only is to be transmitted in the uplink channel. If the decoded field(s) indicate only CQI, control transfers from block 610 to block 612, where the SS transmits only CQI in an assigned uplink channel. If the decoded field(s) indicate CQI and data, control transfers from block 610 to block 614, where the SS transmits CQI and data in the assigned uplink channel. In this manner, communication errors associated with processing delay may be avoided as each uplink grant specifically signals whether an associated uplink transmission should include only CQI or CQI and data. Following blocks 612 and 614, control transfers to block 616 where control returns to a calling routine.

Figure 7:
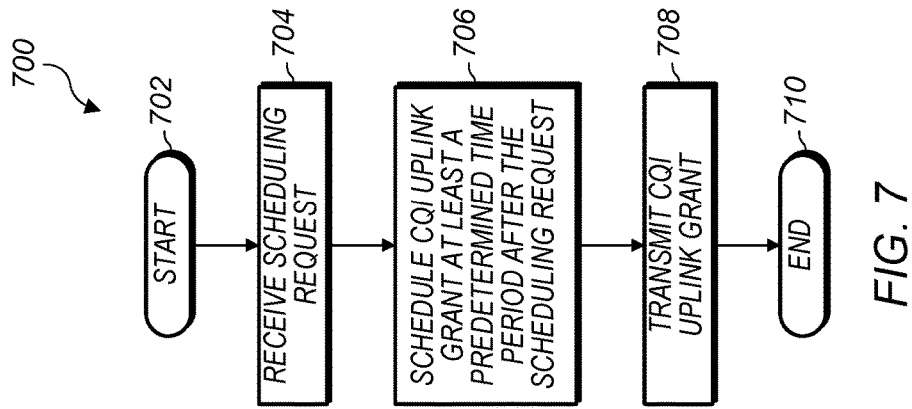
FIG. 7 is a flowchart of an example communication error reduction routine, according to yet another embodiment of the present disclosure.

Turning to FIG. 7, an example communication routine 700 is illustrated that is configured to reduce communication errors in a wireless communication system according to another aspect of the present disclosure. The routine 700, which may be employed in a serving BS, is initiated at block 702, at which point control transfers to block 704. In block 704, a scheduler (associated with the serving BS) receives an SR for an uplink channel allocation from an SS. Next, in block 706, the scheduler schedules an aperiodic CQI uplink grant (for the SS) at least a predetermined time period after the SR. In a typical case, the predetermined time period corresponds to a time period that is greater than a typical processing delay time for providing a data uplink grant (with or without CQI) in response to the SR. Next, in block 708, the serving BS (which is associated with the scheduler) transmits the CQI uplink grant (in a typical case, after transmitting a data uplink grant for the SR). It should be appreciated that if an SR is deferred by the scheduler, a communication error may still be avoided by delaying transmission of the CQI uplink grant for the SS until after transmitting the data uplink grant (for the SR) to the SS. Following block 708, control transfers to block 710 where control returns to a calling routine.

Figure 8:
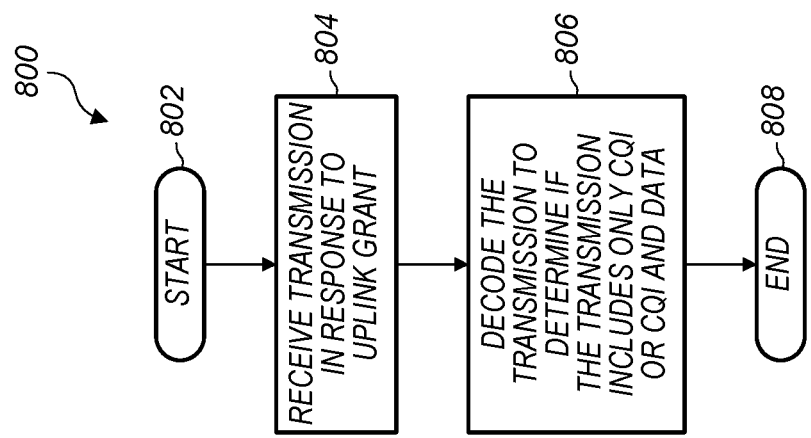
FIG. 8 is a flowchart of an example communication error reduction routine, according to one aspect of the present disclosure.

With reference to FIG. 8, an example communication routine 800 is illustrated that is configured to reduce communication errors in a wireless communication system according to still another aspect of the present disclosure. The routine 800, which may be employed in a serving BS, is initiated at block 802, at which point control transfers to block 804. In block 804, the scheduler receives (via the serving BS) a transmission in response to an uplink grant. Next, in block 806, the serving BS decodes, e.g., using blind decoding, the transmission to determine if the transmission includes only CQI or CQI and data. In this manner, communication errors associated with receiving both CQI and data when only CQI was expected may be avoided, as the serving BS is configured to decode the transmission and ascertain the content of the transmission (i.e., whether the transmission include only CQI or CQI and data). Following block 806, control transfers to block 808 where control returns to a calling routine.

Figure 9:
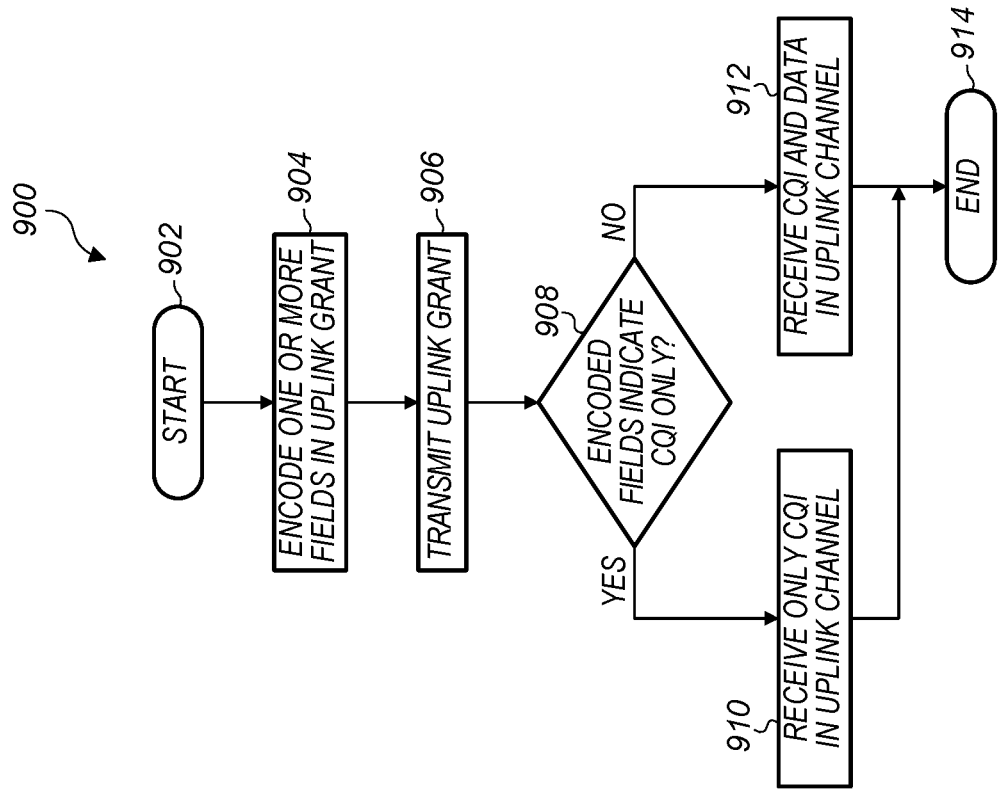
FIG. 9 is a flowchart of an example communication error reduction routine, according to another aspect of the present disclosure.

With reference to FIG. 9, an example communication routine 900 is illustrated that is configured to reduce communication errors in a wireless communication system according to another embodiment of the present disclosure. The routine 900, which may be (at least partially) employed in a serving BS, is initiated at block 902, at which point control transfers to block 904. In block 904, the serving BS encodes one or more fields in an uplink grant. For example, the serving BS may encode a bit in a one-bit CQI request field and five bits in an MCS field to indicate if only CQI or CQI and data are scheduled for an uplink channel associated with the uplink grant. Next, in block 906, the serving BS transmits the uplink grant. Then, in decision block 908, the serving BS receives an uplink communication from the SS (in response to the uplink grant) and (based on how the serving BS encoded the fields) determines whether a received uplink communication includes only CQI. If only CQI was supposed to be transmitted from the SS (according to the encoded fields), control transfers from block 908 to block 910, where only CQI is processed. If CQI and data was supposed to be transmitted from the SS (according to the encoded fields), control transfers from block 908 to block 912, where CQI and data are processed. Following blocks 910 and 912, control transfers to block 914 where control returns to a calling routine.

Figure 10:
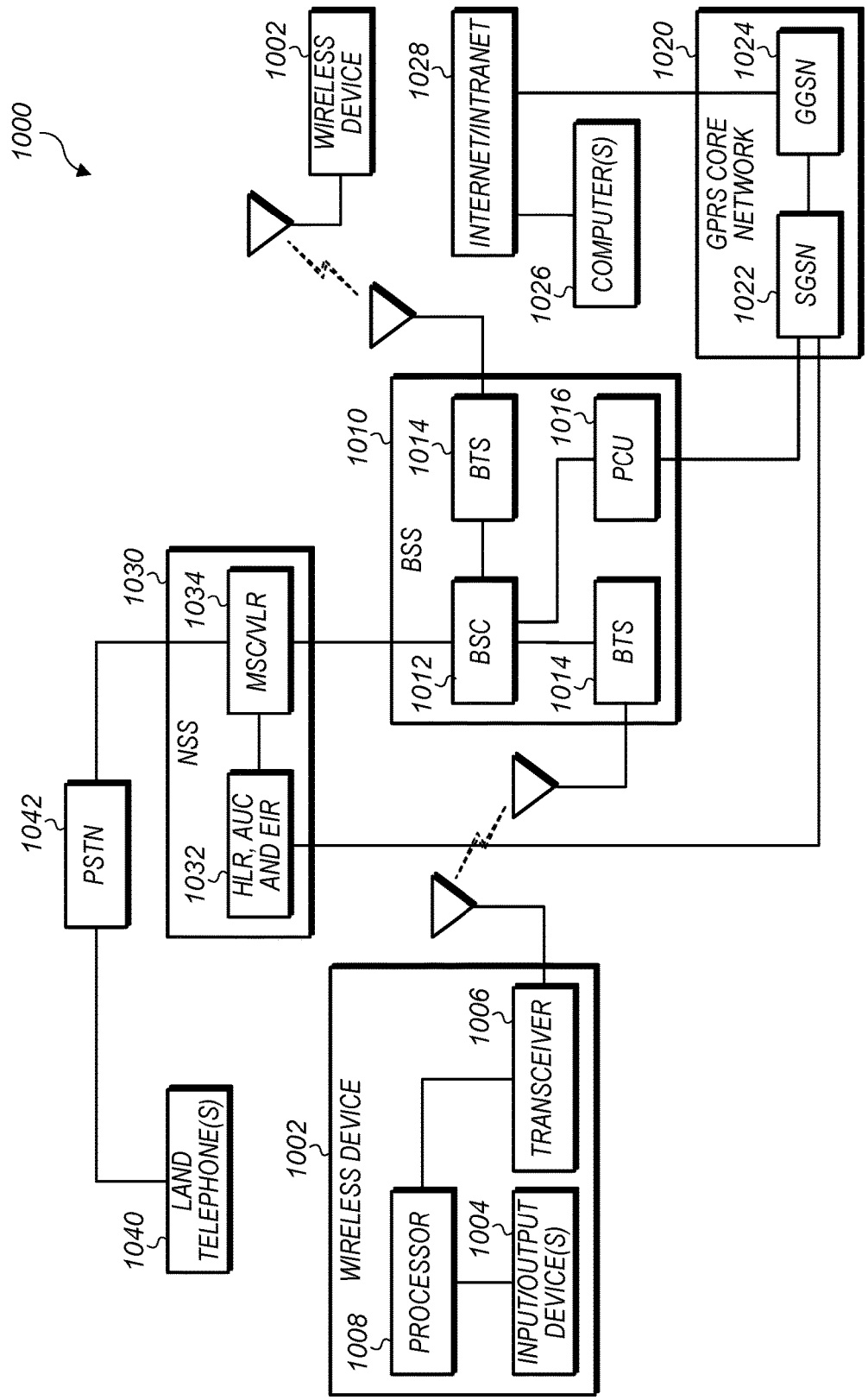
FIG. 10 is a block diagram of an example wireless communication system that may be configured to reduce communication errors according to various embodiments of the present disclosure.

With reference to FIG. 10, an example wireless communication system 1000 is depicted that includes a plurality of subscriber stations or wireless devices 1002, e.g., hand-held computers, personal digital assistants (PDAs), cellular telephones, etc., that may implement communication links according to one or more embodiments of the present disclosure. In general, the wireless devices 1002 include a processor 1008 (e.g., a digital signal processor (DSP)), a transceiver 1006, and one or more input/output devices 1004 (e.g., a camera, a keypad, display, etc.), among other components not shown in FIG. 10. As is noted above, according to various embodiments of the present disclosure, techniques are disclosed that reduce communication errors by configuring a scheduler and/or an SS according to various disclosed techniques. The wireless devices 1002 communicate with a base station controller (BSC) 1012 of a base station subsystem (BSS) 1010, via one or more base transceiver stations (BTS) 1014, to receive or transmit voice and/or data and to receive control signals. The BSC 1012 may, for example, employ a scheduler for scheduling uplink grants and downlink assignments to each of the wireless devices 1002. In general, the BSC 1012 may also be configured to choose a modulation and coding scheme (MCS) for each of the devices 1002, based on channel conditions.

The BSC 1012 is also in communication with a packet control unit (PCU) 1016, which is in communication with a serving general packet radio service (GPRS) support node (SGSN) 1022. The SGSN 1022 is in communication with a gateway GPRS support node (GGSN) 1024, both of which are included within a GPRS core network 1020. The GGSN 1024 provides access to computer(s) 1026 coupled to Internet/intranet 1028. In this manner, the wireless devices 1002 may receive data from and/or transmit data to computers coupled to the Internet/intranet 1028. For example, when the devices 1002 include a camera, images may be transferred to a computer 1026 coupled to the Internet/intranet 1028 or to another one of the devices 1002. The BSC 1012 is also in communication with a mobile switching center/visitor location register (MSC/VLR) 1034, which is in communication with a home location register (HLR), an authentication center (AUC), and an equipment identity register (EIR) 1032. In a typical implementation, the MSC/VLR 1034 and the HLR, AUC, and EIR 1032 are located within a network and switching subsystem (NSS) 1030, which performs various functions for the system 1000. The SGSN 1022 may communicate directly with the HLR, AUC, and EIR 1032. As is also shown, the MSC/VLR 1034 is in communication with a public switched telephone network (PSTN) 1042, which facilitates communication between wireless devices 1002 and land telephone(s) 1040.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware, or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

Although the invention is described herein with reference to specific embodiments, various modifications and changes can be made without departing from the scope of the present invention as set forth in the claims below. For example, many of the techniques disclosed herein are broadly applicable to a variety of reference signals employed in wireless communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An apparatus, comprising:
wireless transceiver circuitry; and
one or more processing elements configured to:
   transmit, using the wireless transceiver circuitry, a scheduling request;
   receive, via the wireless transceiver circuitry following the scheduling request, an uplink grant that assigns an uplink channel to the apparatus;
   determine the duration of a time interval that begins with transmission of the scheduling request and ends with receipt of the uplink grant; and
   transmit, using the wireless transceiver circuitry, only channel quality information in the assigned uplink channel in response to determining that the time interval is shorter in length than a predetermined threshold time interval.

2. The apparatus of claim 1, wherein the apparatus is further configured to:
transmit channel quality information and data on the uplink channel, using the wireless transceiver circuitry, in response to determining that the time interval is greater than the predetermined threshold time interval.

3. The apparatus of claim 1, wherein the uplink grant is an aperiodic channel quality information uplink grant.

4. A non-transitory computer-readable medium having instructions stored thereon that are executable by a computing device to perform operations comprising:
transmitting a scheduling request from the computing device;
receiving, following the scheduling request, an uplink grant that assigns an uplink channel to the computing device;

determining the duration of a time interval that begins with transmission of the scheduling request and ends with the uplink grant; and transmitting only channel quality information in the assigned uplink channel in response to determining that the time interval is shorter in length than a predetermined threshold time interval.

5. The non-transitory computer-readable medium of claim 4, wherein the operations further comprise:

transmitting the channel quality information and data in the uplink channel when the uplink grant requests the channel quality information and the time interval is greater than the predetermined threshold time interval.

6. The non-transitory computer-readable medium of claim 4, wherein the uplink grant is an aperiodic channel quality information uplink grant.

7. A wireless base station apparatus, comprising:

a transceiver; and a processor coupled to the transceiver and configured to:

receive a scheduling request from a mobile device via the transceiver;

schedule a channel quality information only uplink grant for the mobile device at least a predetermined time interval after the scheduling request, using the transceiver, wherein the channel quality information only uplink grant assigns an uplink channel to the mobile device; and transmit, using the transceiver, the scheduled channel quality information only uplink grant based on the schedule, wherein the mobile device is configured to respond with only channel quality information in response to receiving an uplink grant within less than the predetermined time interval after sending the scheduling request and is configured to respond with both channel quality information and data in response to receiving an uplink grant after a time interval greater than the predetermined time interval.

* * * * *